United States Patent
Yui et al.

(10) Patent No.: US 12,076,945 B2
(45) Date of Patent: Sep. 3, 2024

(54) METHOD FOR MOLDING COMPOSITE MATERIAL AND APPARATUS FOR MOLDING COMPOSITE MATERIAL

(71) Applicant: MITSUBISHI HEAVY INDUSTRIES, LTD., Tokyo (JP)

(72) Inventors: Yuichi Yui, Tokyo (JP); Akihisa Okuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 312 days.

(21) Appl. No.: 17/626,448

(22) PCT Filed: Mar. 19, 2020

(86) PCT No.: PCT/JP2020/012206
§ 371 (c)(1),
(2) Date: Jan. 11, 2022

(87) PCT Pub. No.: WO2021/186659
PCT Pub. Date: Sep. 23, 2021

(65) Prior Publication Data
US 2022/0258438 A1    Aug. 18, 2022

(51) Int. Cl.
*B29C 70/44* (2006.01)
*B29C 43/36* (2006.01)
(Continued)

(52) U.S. Cl.
CPC .......... *B29C 70/44* (2013.01); *B29C 43/3607* (2013.01); *B29C 43/3642* (2013.01);
(Continued)

(58) Field of Classification Search
CPC .............................. B29C 70/44; B29C 70/544
See application file for complete search history.

(56) References Cited

U.S. PATENT DOCUMENTS

| 2008/0048369 A1* | 2/2008 | Kulesha .............. B29C 43/3642 264/571 |
| 2010/0112117 A1 | 5/2010 | Ross et al. |

(Continued)

FOREIGN PATENT DOCUMENTS

| FR | 2459118 A * | 2/1981 | ............. B29C 70/44 |
| JP | 2005047131 A | 2/2005 | |

(Continued)

OTHER PUBLICATIONS

International Search Report of International Application No. PCT/JP2020/012206 mailed Jun. 9, 2020; 5pp.

*Primary Examiner* — Robert B Davis
(74) *Attorney, Agent, or Firm* — HAUPTMAN HAM, LLP

(57) ABSTRACT

A method for molding a composite material includes arranging a prepreg on a jig molding surface of a jig for molding. The method includes sealing a first endless seal region that surrounds the prepreg is formed by bonding a resin bag and the jig molding surface by a first sealing material and a second endless seal region that surrounds the prepreg and is positioned outside the first seal region is formed by bonding a resin bag and the jig molding surface by a second sealing material. The method includes depressurizing a first space inside the first seal region and a second space between the first seal region and the second seal region are depressurized. The method includes thermally curing the prepreg by supplying a water vapor into the internal space of a pressure vessel, while holding the pressure vessel in a sealed state.

8 Claims, 7 Drawing Sheets

(51) Int. Cl.
  *B29C 43/56* (2006.01)
  *B29C 70/54* (2006.01)
  *B29K 105/08* (2006.01)

(52) U.S. Cl.
  CPC ........ *B29C 43/56* (2013.01); *B29C 2043/562* (2013.01); *B29K 2105/0872* (2013.01)

(56) References Cited

U.S. PATENT DOCUMENTS

| | | | |
|---|---|---|---|
| 2012/0133067 A1* | 5/2012 | Ashida | B29C 35/007 264/40.3 |
| 2012/0298296 A1 | 11/2012 | Thompson et al. | |
| 2013/0175740 A1 | 7/2013 | Shinoda et al. | |
| 2016/0263784 A1 | 9/2016 | Itou et al. | |

FOREIGN PATENT DOCUMENTS

| | | | |
|---|---|---|---|
| JP | 2012507416 A | 3/2012 |
| JP | 2012086547 A | 5/2012 |
| JP | 2016168684 A | 9/2016 |
| JP | 6598477 B | 10/2019 |

\* cited by examiner

METHOD FOR MOLDING COMPOSITE MATERIAL AND APPARATUS FOR MOLDING COMPOSITE MATERIAL

RELATED APPLICATION(S)

The present application is a National Phase of International Application Number PCT/JP2020/012206 filed Mar. 19, 2020.

TECHNICAL FIELD

The present disclosure relates to a composite material molding method and a composite material molding device.

BACKGROUND ART

In the related art, a molding method for a composite material, in which an autoclave is used, is widely used as a method of molding a composite material obtained by laminating fiber preforms. In the molding method of the related art, a prepreg containing an uncured matrix resin is covered with a bag film, an inside of the bag film is depressurized, and the prepreg is brought into a pressurized state due to a pressure difference with a gas in an external space. In addition, the prepreg is brought into a heated state by filling a space outside the bag film with heated air.

In addition, in recent years, a technique of using steam having a larger heat capacity than air as a heating source has been proposed (for example, refer to PTL 1). PTL 1 discloses that a prepreg bending molding is performed by covering a prepreg with a silicone rubber bag and heating the prepreg with steam while depressurizing a space where the prepreg is disposed.

CITATION LIST

Patent Literature

[PTL 1] Japanese Patent No. 6598477

SUMMARY OF INVENTION

Technical Problem

However, in PTL 1, the prepreg is closed by placing an outer frame and clamping with a vice such that a gap is not generated between the silicone rubber bag and a box-type jig, after the silicone rubber bag is laid on the prepreg. For this reason, special jigs such as the box-type jig and the outer frame are required, and complicated work of clamping with the vice is required. Thus, making the special jigs and complicated work unnecessary, for example, by adhering a bag to a jig molding surface on which the prepreg is placed with a sealant is considered.

However, in a case of using a resin film having high adhesion to the sealant as a bagging material, the resin bag or the sealant, in which is the resin film used, is partially deteriorated or destroyed due to hydrolysis caused by steam, and thus there is a possibility that adhesion between the resin bag and the sealant or adhesion between the sealant and the jig molding surface declines. In this case, there is a possibility that the steam flows from the prepreg toward a space between the resin bag and the sealant or between the sealant and the jig molding surface.

The present disclosure is devised in view of such circumstances, and an object thereof is to provide a composite material molding method and a composite material molding device that can efficiently heat a composite material using steam and prevent the steam from reaching the composite material.

Solution to Problem

According to an aspect of the present disclosure, there is provided a composite material molding method of molding a composite material, the method including a disposing step of disposing the composite material on a jig molding surface of a molding jig provided in an internal space of a pressure vessel capable of being closed, a sealing step of forming an endless first sealing region that surrounds the composite material by adhering a resin bag and the jig molding surface to each other with a first sealant, forming an endless second sealing region that surrounds the composite material and is disposed on an outer side from the first sealing region by adhering the resin bag and the jig molding surface to each other with a second sealant, and airtightly sealing the composite material with the resin bag, a depressurizing step of depressurizing a first space on an inner side of the first sealing region and a second space between the first sealing region and the second sealing region, and a heat-curing step of heat-curing the composite material by supplying steam with a predetermined temperature and a predetermined pressure to the internal space of the pressure vessel in a state where the pressure vessel is closed. In the sealing step, a ventilation member for securing a ventilation space is disposed in the second space to surround the first sealing region.

According to another aspect of the present disclosure, there is provided a composite material molding device that molds a composite material, the device including a pressure vessel capable of being closed, a molding jig that is provided in an internal space of the pressure vessel and has a jig molding surface for disposing the composite material, a resin bag that forms an endless first sealing region which surrounds the composite material by being adhered to the jig molding surface with a first sealant, forms an endless second sealing region which surrounds the composite material and is disposed on an outer side from the first sealing region by being adhered to the jig molding surface with a second sealant, and airtightly seals the composite material, a depressurizing unit that depressurizes a first space on an inner side of the first sealing region and a second space between the first sealing region and the second sealing region, a ventilation member that secures a ventilation space in the second space depressurized by the depressurizing unit, and a steam supply unit that supplies steam with a predetermined temperature and a predetermined pressure to the internal space of the pressure vessel in a state where the pressure vessel is closed, and heat-cures the composite material.

Advantageous Effects of Invention

With the present disclosure, it is possible to provide the composite material molding method and the composite material molding device that can efficiently heat the composite material using steam and prevent the steam from reaching the composite material.

DESCRIPTION OF EMBODIMENTS

Figure 1:
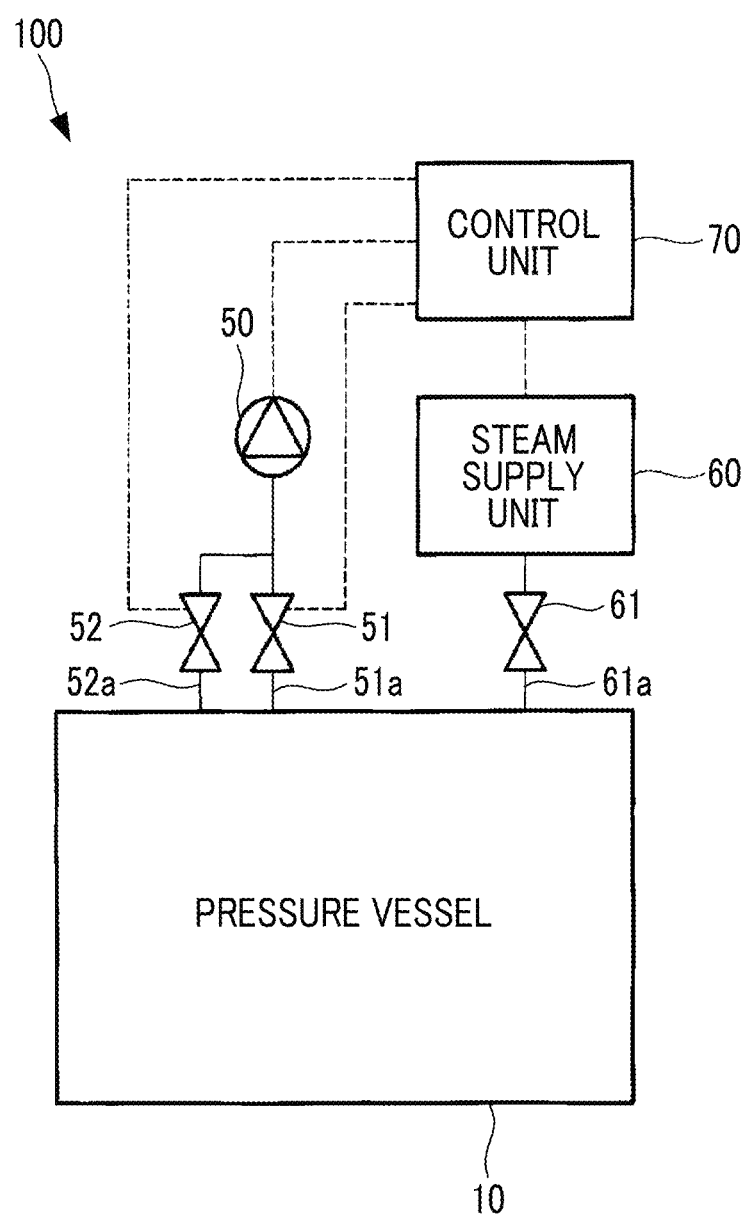
FIG. 1 is a schematic configuration diagram showing a composite material molding device according to one embodiment of the present disclosure.
Figure 2:
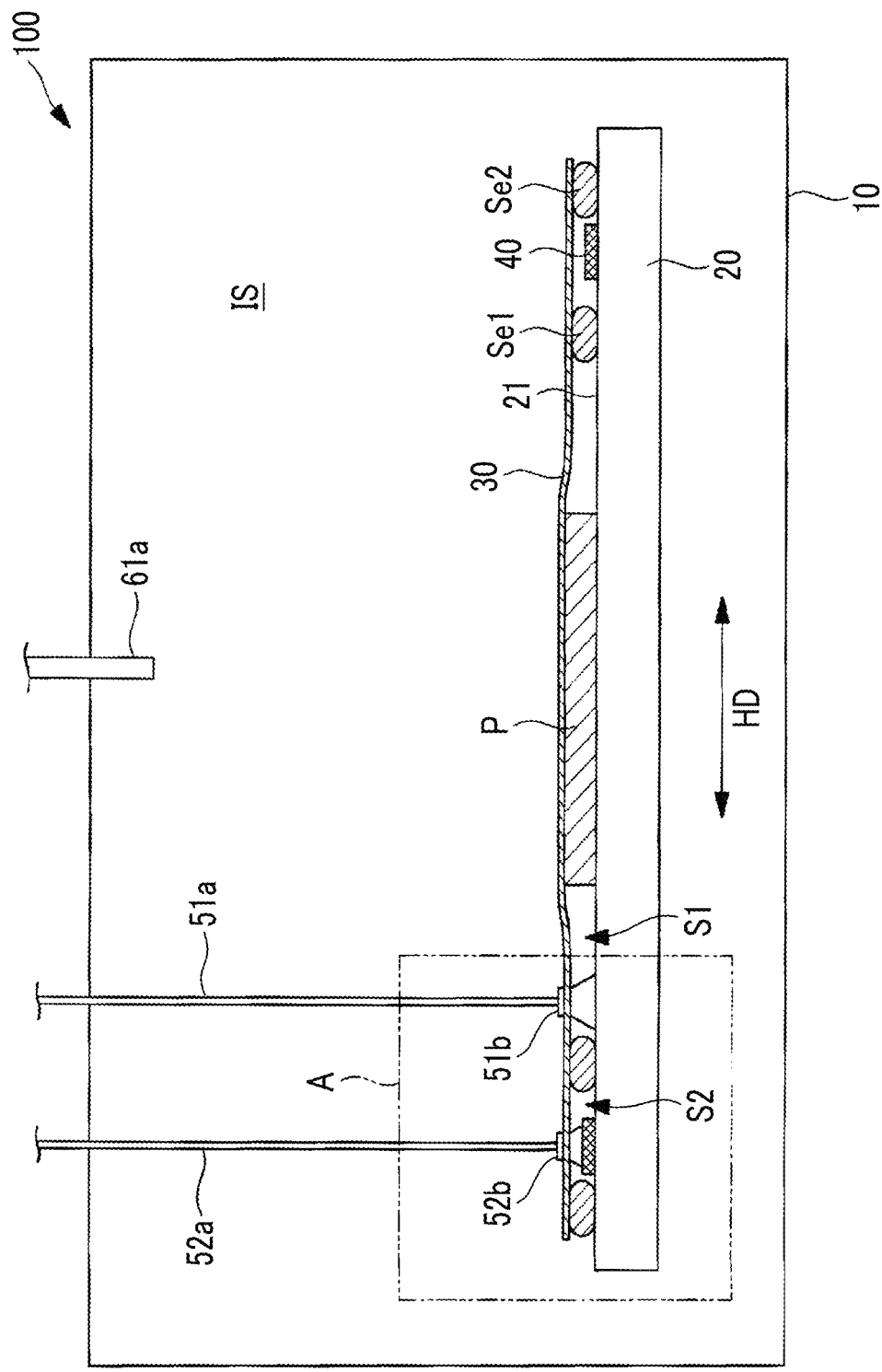
FIG. 2 is a vertical sectional view of the composite material molding device shown in FIG. 1.
Figure 3:
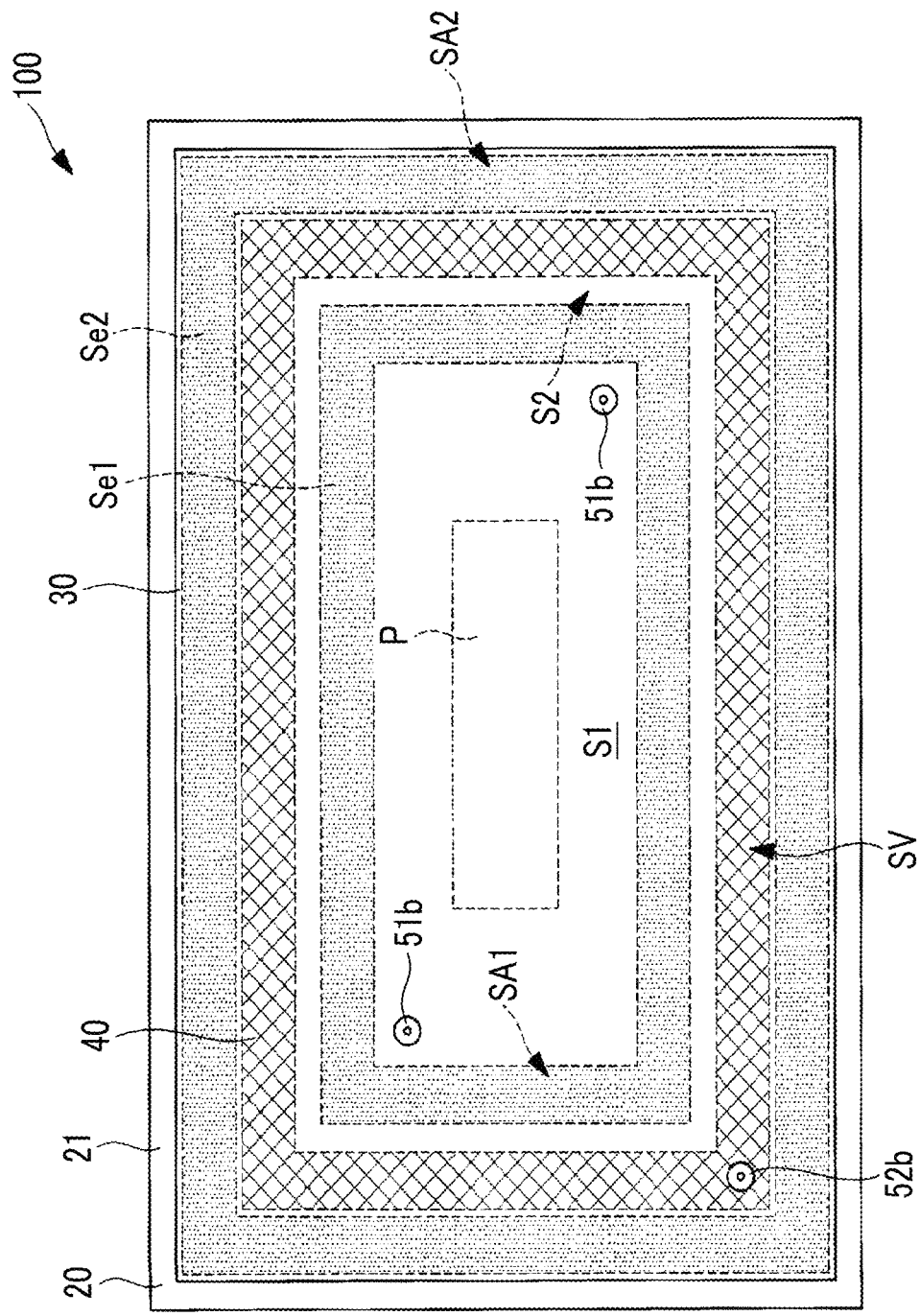
FIG. 3 is a plan view of an internal space of a pressure vessel shown in FIG. 2, which is viewed from above.
Figure 4:
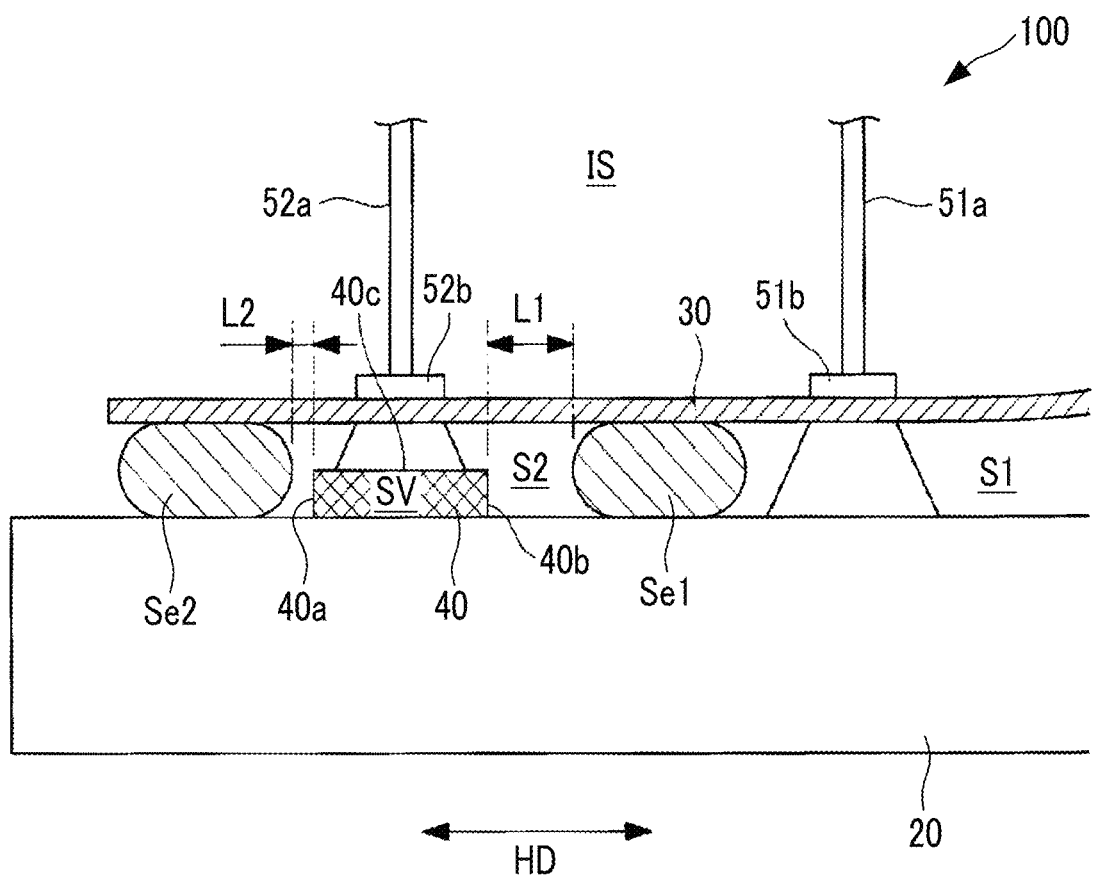
FIG. 4 is a partially enlarged view of a portion A of the composite material molding device shown in FIG. 2.

Hereinafter, a composite material molding device 100 and a composite material molding method using the composite material molding device according to a first embodiment of the present disclosure will be described with reference to the drawings. FIG. 1 is a schematic configuration diagram showing the composite material molding device 100 according to one embodiment of the present disclosure. FIG. 2 is a vertical sectional view of the composite material molding device 100 shown in FIG. 1. FIG. 3 is a plan view of an internal space shown in FIG. 2, which is viewed from above. FIG. 4 is a partially enlarged view of a portion A of the composite material molding device 100 shown in FIG. 2.

The composite material molding device 100 of the present embodiment is a device that molds a fiber-reinforced composite material having a desired shape by heat-curing a prepreg (composite material; laminate) P obtained by laminating a fiber preform over a plurality of layers, together with a resin material. Herein, the prepreg means a material that contains a fiber preform and an uncured matrix resin and becomes a fiber-reinforced composite material as the fiber preform and the uncured matrix resin are heat-cured. In addition, the fiber preform is, for example, carbon fiber, glass fiber, and aramid fiber. In addition, the matrix resin is a heat-curing resin, such as epoxy, unsaturated polyester, vinyl ester, bismaleimide, phenol, cyanate, and polyimide. By heat-curing one or a plurality of sheets of prepregs, a fiber-reinforced composite material is molded.

As shown in FIGS. 1 and 2, the composite material molding device 100 of the present embodiment includes a pressure vessel 10 capable of being closed, a molding jig 20, a resin bag 30, a breather (ventilation member) 40, a vacuum pump (depressurizing unit) 50, a steam supply unit 60, and a control unit 70.

The pressure vessel 10 is a vessel capable of being closed, to which an openable and closable door (not shown) is attached and which forms an internal space IS closed by bringing the door into a closed state. The internal space IS of the pressure vessel 10 accommodates the molding jig 20 and the prepreg P disposed on the molding jig 20.

The molding jig 20 is a member that is provided in the internal space IS of the pressure vessel 10, has a jig molding surface 21 for disposing the prepreg P, and is formed in a plate shape. The molding jig 20 is disposed on a provision table (not shown) provided in the internal space IS of the pressure vessel 10. The jig molding surface 21 of the molding jig 20 is a surface extending along a horizontal direction HD shown in FIG. 2, and the prepreg P is disposed on the jig molding surface 21. The molding jig 20 is formed of, for example, a heat-resistant metallic material such as an aluminum alloy and iron. In addition, the molding jig 20 may be formed of a fiber-reinforced composite material including a fiber preform, such as glass fiber, and a matrix resin.

The resin bag 30 is a sheet-shaped member that covers the entire surface of the prepreg P and airtightly seals the prepreg P by being adhered to the jig molding surface 21 of the molding jig 20 with a first sealant Se1 and a second sealant Se2. The resin bag 30 is formed of a resin film of which a main component is nylon, polyurethane, and a fluorine-based resin material (for example, FEP and ETFE). It is desirable that the resin bag 30 has a thickness of, for example, 25 μm or more and 75 μm or less. The first sealant Se1 and the second sealant Se2 are formed of, for example, a material of which a main component is butyl rubber and a material of which a main component is silicone rubber.

As shown in FIG. 3, the resin bag 30 forms an endless first sealing region SA1 that surrounds the entire periphery of the prepreg P, by being adhered to the jig molding surface 21 with the first sealant Se1. In addition, the resin bag 30 forms an endless second sealing region SA2 that surrounds the entire periphery of the prepreg P, by being adhered to the jig molding surface 21 with the second sealant Se2. The second sealing region SA2 is disposed on an outer side of the first sealing region SA1 to surround the first sealing region SA1.

In this manner, the resin bag 30 separates a space where the prepreg P is disposed from the internal space IS of the pressure vessel 10 with a double sealing region including the first sealing region SA1 and the second sealing region SA2. On an inner side of the first sealing region SA1, a space defined by the first sealant Se1, the resin bag 30, and the jig molding surface 21 is a first space S1. On an inner side of the second sealing region SA2, a space defined by the first sealant Se1, the second sealant Se2, the resin bag 30, and the jig molding surface 21 is a second space S2. The second space S2 is formed between the first sealing region SA1 and the second sealing region SA2.

As shown in FIG. 2, the breather 40 is a member that secures a ventilation space SV in the second space S2 depressurized by the vacuum pump 50 and flows steam infiltrating from the internal space IS of the pressure vessel 10 into the second space S2. The ventilation space SV is a space secured inside the breather 40. The breather 40 is a member that is formed of, for example, a glass woven fabric, a carbon fiber woven fabric, and metal mesh, and can flow a gas in the ventilation space SV secured inside. The breather 40 has a thickness of, for example, 0.1 mm or more and 5 mm or less.

As shown in FIG. 3, the breather 40 is disposed in the second space S2 to surround the entire periphery of the first sealing region SA1. Since the breather 40 is disposed on the entire periphery of the second space S2, steam infiltrating from any position in the second sealing region SA2 can be reliably flowed to the ventilation space SV.

As shown in FIG. 4, the breather 40 is disposed in the second space S2 such that a distance L2 from an outer periphery-side end portion 40a to the second sealant Se2 in the horizontal direction HD is shorter than a distance L1 from an inner periphery-side end portion 40b to the first sealant Se1 in the horizontal direction HD.

The vacuum pump 50 is a device that depressurizes the first space S1 and the second space S2, which are sealed with the resin bag 30. As shown in FIG. 1, the vacuum pump 50 is connected to a pipe 51a via an opening-closing valve 51, and is connected to a pipe 52a via an opening-closing valve 52. As shown in FIG. 2, the pipe 51*a* is connected to a vacuum port 51*b* (first depressurization port) attached to the resin bag 30, and the pipe 52*a* is connected to a vacuum port 52*b* (second depressurization port) attached to the resin bag 30.

As shown in FIG. 3, the vacuum ports 51*b* are attached at two places on the resin bag 30 to communicate with the first space S1. The two vacuum ports 51*b* are disposed at positions spaced apart from each other with the prepreg P interposed therebetween such that the prepreg P is disposed on a straight line connecting the attached positions with respect to the resin bag 30. Each of the vacuum port 51*b* is connected to the pipe 51*a*.

The vacuum port 52*b* is attached at one place on the resin bag 30 to communicate with the second space S2. The number (two) of vacuum ports 51*b* attached to the resin bag 30 is often larger than the number (one) of vacuum port 52*b* attached to the resin bag 30. Although the number of vacuum ports 51*b* is two and the number of vacuum port 52*b* is one in FIG. 3, other forms may be adopted. The number of vacuum ports 51*b* and vacuum ports 52*b* may be any number, such as the number of vacuum ports 51*b* is larger than the number of vacuum ports 52*b*.

The vacuum pump 50, the opening-closing valve 51, and the opening-closing valve 52 are respectively controlled by control signals transmitted from the control unit 70 via control signal lines (broken lines in FIG. 1). As the control unit 70 brings the vacuum pump 50 into an operating state and brings the opening-closing valve 51 into an open state, air in the first space S1 is sucked via the vacuum port 51*b*, and the first space S1 is depressurized to a vacuum state. In addition, as the control unit 70 brings the vacuum pump 50 into the operating state and brings the opening-closing valve 52 into an open state, air in the second space S2 is sucked via the vacuum port 52*b*, and the second space S2 is depressurized to a vacuum state.

As shown in FIG. 4, the vacuum port 52*b* is disposed to be in contact with an upper surface 40*c* of the breather 40. For this reason, even when steam has infiltrated from a gap between the resin bag 30 and the second sealant Se2, the steam can be introduced to the vacuum port 52*b* via the breather 40.

The steam supply unit 60 is a device that supplies steam with a predetermined temperature and a predetermined pressure to the internal space IS of the pressure vessel 10 in a state where the pressure vessel 10 is closed, and heat-cures the prepreg P. As shown in FIG. 1, the steam supply unit 60 is connected to a pipe 61*a* via an opening-closing valve 61. As shown in FIG. 2, the pipe 61*a* communicates with the internal space IS of the pressure vessel 10.

As shown in FIG. 1, the steam supply unit 60 and the opening-closing valve 61 are controlled by a control signal transmitted from the control unit 70 via a control signal line. As the control unit 70 brings a steam supply unit 60 into an operating state and brings the opening-closing valve 61 into an open state, steam is supplied to the internal space IS via the pipe 61*a*.

The steam supply unit 60 generates, for example, saturated steam as steam to be supplied to the internal space IS of the pressure vessel 10. The control unit 70 controls the steam supply unit 60 such that the temperature of the saturated steam is, for example, within a range of 160° C. or higher and 190° C. or lower. The saturated steam pressure is uniquely determined with respect to the temperature. For this reason, the saturated steam pressure is within a range of approximately 6 atm (absolute pressure) to approximately 13 atm (absolute pressure).

The control unit 70 is a device that controls the composite material molding device 100. The control unit 70 controls the vacuum pump 50, the opening-closing valve 51, the opening-closing valve 52, the steam supply unit 60, and the opening-closing valve 61 via the control signal lines shown by the broken lines in FIG. 1.

Figure 5:
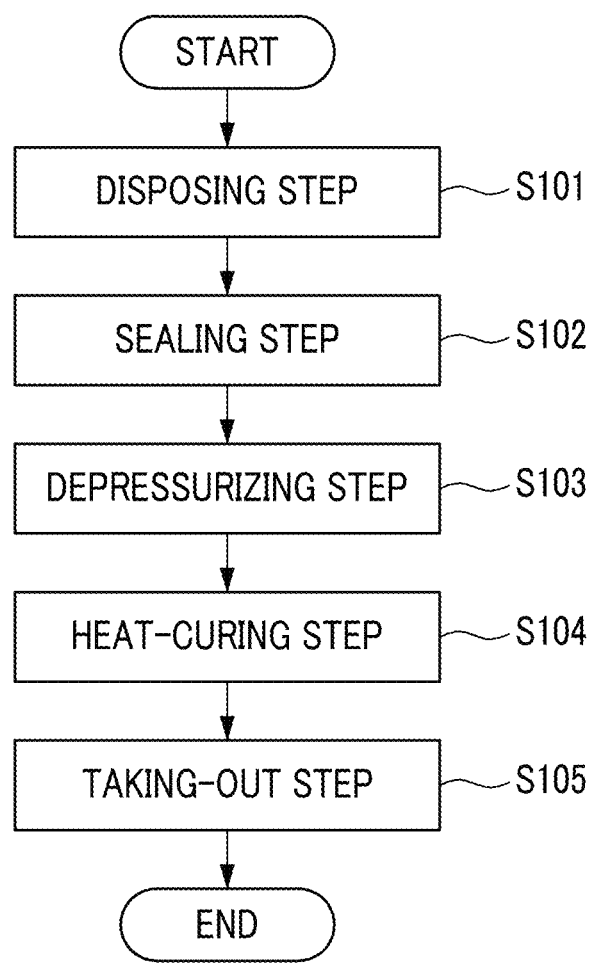
FIG. 5 is a flowchart showing a composite material molding method according to the embodiment of the present disclosure.

Next, the composite material molding method performed by the composite material molding device 100 of the present embodiment will be described with reference to FIG. 5. FIG. 5 is a flowchart showing the composite material molding method according to the present embodiment.

In Step S101 (disposing step), the prepreg P is disposed on the jig molding surface 21 of the molding jig 20.

In Step S102 (sealing step), the prepreg P is airtightly sealed with the resin bag 30. Specifically, the endless first sealing region SA1 surrounding the prepreg P is formed by adhering the resin bag 30 and the jig molding surface 21 to each other with the first sealant Se1. In addition, the endless second sealing region SA2 surrounding the prepreg P is formed by adhering the resin bag 30 and the jig molding surface 21 to each other with the second sealant Se2.

In Step S102, the breather 40 for securing the ventilation space SV is disposed in the second space S2 to surround the first sealing region SA1. In addition, in Step S102, the breather 40 is disposed in the second space S2 such that the distance L2 from the outer periphery-side end portion 40*a* of the breather 40 to the second sealant Se2 in the horizontal direction HD is shorter than the distance L1 from the inner periphery-side end portion 40*b* of the breather 40 to the first sealant Se1 in the horizontal direction HD.

In Steps S101 to S102 described above, the door is in an open state without closing the pressure vessel 10. When Step S102 ends, an operator of the composite material molding device 100 brings the door into a closed state, and closes the pressure vessel 10. The processing from Steps S101 to S102 may be performed outside the pressure vessel 10.

In Step S103 (depressurizing step), the vacuum pump 50 is brought into an operating state, the opening-closing valve 51 is brought into an open state, and the first space S1 sealed with the resin bag 30 is depressurized by sucking air in the first space S1 via the vacuum port 51*b*. The control unit 70 continues processing of depressurizing the first space S1 to maintain a vacuum state until Step S104, which is to be described later, ends.

In addition, in Step S103, the vacuum pump 50 is brought into an operating state, the opening-closing valve 52 is brought into an open state, and the second space S2 sealed with the resin bag 30 is depressurized by sucking air in the second space S2 via the vacuum port 52*b*. The control unit 70 continues processing of depressurizing the second space S2 to maintain a vacuum state until Step S104, which is to be described later, ends.

In Step S104 (heat-curing step), depending on the fact that the first space S1 and the second space S2 are in a vacuum state, the steam supply unit 60 and the opening-closing valve 61 are controlled in a state where the pressure vessel 10 is closed such that steam with a predetermined temperature and a predetermined pressure is supplied to the internal space IS of the pressure vessel 10.

The prepreg P disposed in the internal space IS of the pressure vessel 10 is brought into a pressurized state due to a differential pressure between the pressure of the first space S1 depressurized in a vacuum state and the internal space IS pressurized by steam. In addition, the prepreg P is brought into a heated state due to heat transmitted from the steam. As the pressurized state and the heated state are continued for a predetermined time, a heat-curing resin, which is a matrix resin, is cured and the prepreg P is cured in a state of maintaining a desired shape. Accordingly, a composite material obtained by curing a matrix resin is molded from the prepreg P.

In Step S105 (taking-out step), operations of the vacuum pump 50 and the steam supply unit 60 are stopped. The operator of the composite material molding device 100 confirms that the internal space IS of the pressure vessel 10 has a temperature and a pressure that allow a composite material to be taken out, and brings the door of the pressure vessel 10 into an open state.

After then, the operator of the composite material molding device 100 takes out the cured composite material from the internal space IS of the pressure vessel 10 to the outside. In addition, the operator of the composite material molding device 100 removes the resin bag 30 from the jig molding surface 21 of the molding jig 20, and exposes the composite material. In this manner, the composite material is molded.

Figure 6:
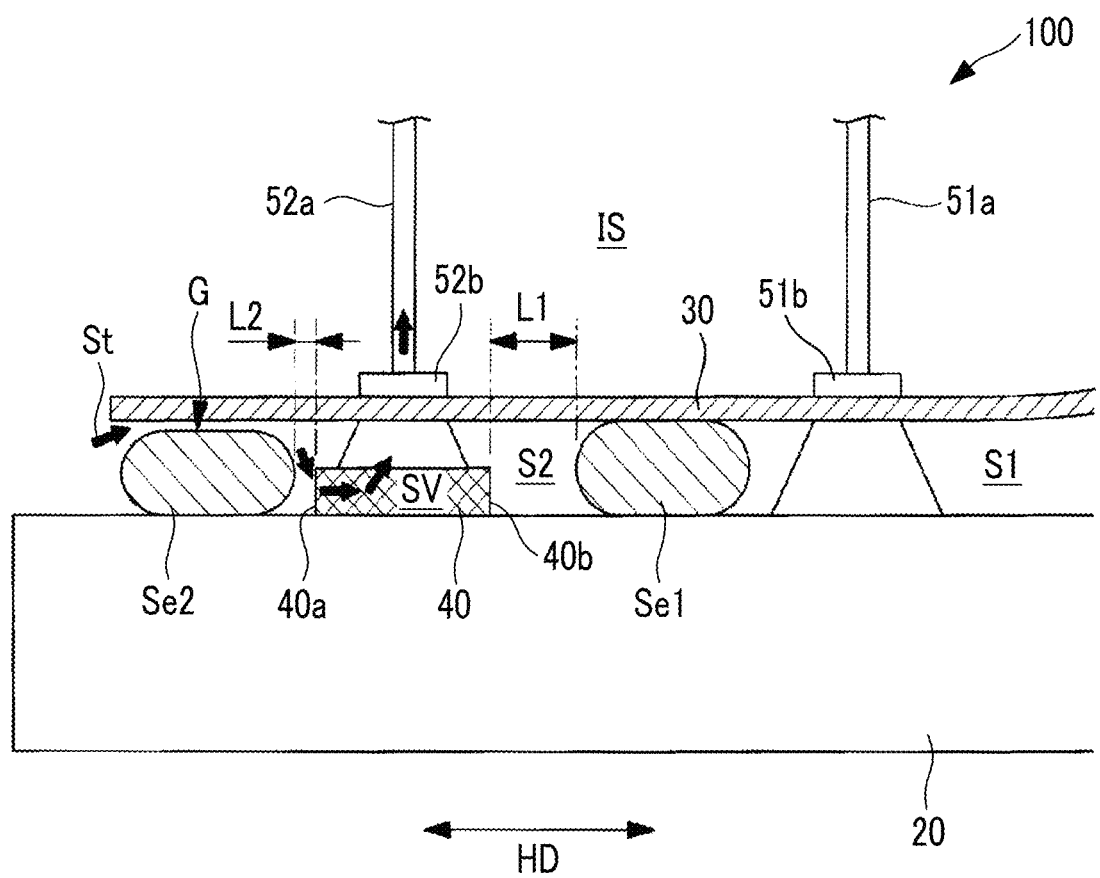
FIG. 6 is a partially enlarged view of the composite material molding device shown in FIG. 2, and shows a state where steam infiltrates from a gap between a resin bag and a second sealant.
Figure 7:
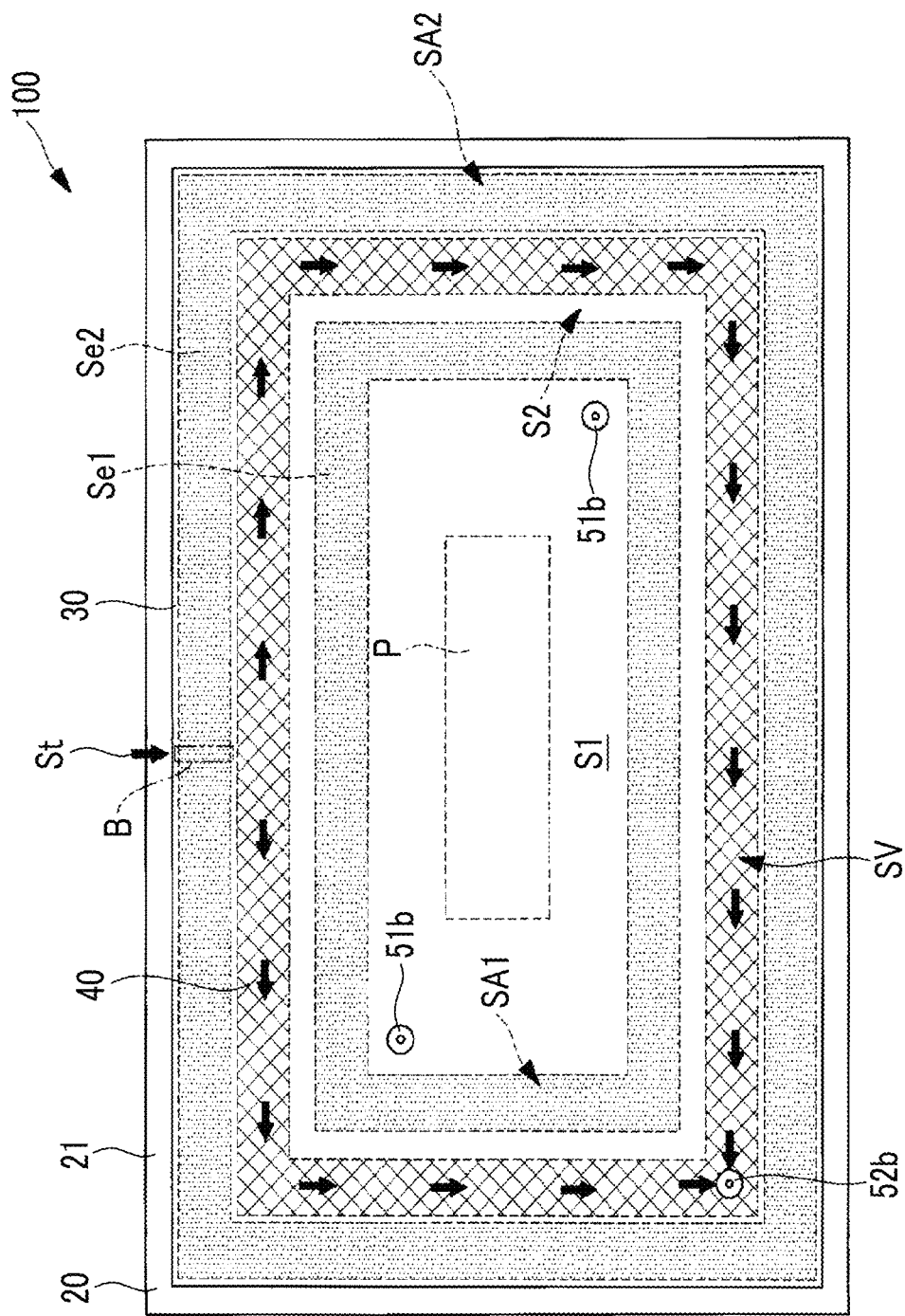
FIG. 7 is a plan view of the internal space of the pressure vessel shown in FIG. 2, which is viewed from above, and shows a state where the steam infiltrates from a gap between the resin bag and the second sealant, which is in a portion B.

Herein, a phenomenon that can occur when the composite material molding device 100 of the present embodiment performs Step S104 (heat-curing step) will be described. FIG. 6 is a partially enlarged view of the composite material molding device 100 shown in FIG. 2, and shows a state where steam infiltrates from a gap G between the resin bag 30 and the second sealant Se2. FIG. 7 is a plan view of the internal space IS of the pressure vessel 10 shown in FIG. 2, which is viewed from above, and shows a state where steam infiltrates from a gap between the resin bag 30 and the second sealant Se2, which is in a portion B.

FIG. 6 shows a state where the resin bag 30 is peeled off from the second sealant Se2 and the gap G, which is in a part of the second sealing region SA2, is formed between the resin bag 30 and the second sealant Se2. Arrows shown in FIG. 6 indicate steam St, and the steam St in the internal space IS infiltrates into the second space S2 via the gap G.

In this case, the steam St infiltrates into the second space S2, but the pressure of the second space S2 is sufficiently lower than the pressure of the internal space IS, so that the steam St diffuses in the second space S2 along the ventilation space SV formed by the breather 40. For this reason, the steam St that has infiltrated from the gap G is prevented from directly coming into contact with the first sealant Se1 disposed on an inner peripheral side of the second space S2.

In addition, when Step S104 (heat-curing step) is being performed, a gas in the second space S2 is sucked out from the vacuum port 52b toward the vacuum pump 50 at all times. For this reason, the steam St that has infiltrated from the gap G into the second space S2 flows into the ventilation space SV of the breather 40, is introduced from the vacuum port 52b to the vacuum pump 50 by a suction force of the vacuum pump 50 in the end, and is discharged to the outside.

As shown in FIG. 7, when the gap in the B portion is formed between the resin bag 30 and the second sealant Se2, steam infiltrates from the portion B into the second space S2. In this case, as shown by arrows in FIG. 7, the steam flows in the second space S2 along the ventilation space SV formed inside the breather 40.

Then, the steam is introduced from the vacuum port 52b to the vacuum pump 50 by a suction force of the vacuum pump in the end, and is discharged to the outside. The breather 40 serves a role of protecting the first sealant Se1 formed by the first sealing region A from the steam St that has infiltrated from the gap G into the second space S2 in this manner.

The workings and effects achieved by the composite material molding method of the present embodiment described above will be described.

In order to heat-cure the prepreg P in the composite material molding method of the present embodiment, steam with a predetermined temperature and a predetermined pressure is supplied to the internal space IS of the pressure vessel 10 in the heat-curing step. For this reason, the composite material can be efficiently and quickly heated with the steam having a larger heat capacity than air compared to a case where the air is used as a heating source.

In addition, the endless first sealing region SA1 is formed by adhering the resin bag 30 and the jig molding surface 21 to each other with the first sealant Se1, and the endless second sealing region SA2 disposed on the outer side from the first sealing region SA1 is formed by adhering the resin bag 30 and the jig molding surface 21 to each other with the second sealant Se2. Since both of the first sealing region SA1 and the second sealing region SA2 are disposed on the outer side of the prepreg P, even when steam has infiltrated from a part of the second sealing region SA2, the steam can be prevented from infiltrating into the first space S1 where the prepreg P is disposed due to the first sealing region SA1 disposed on the inner side of the second sealing region SA2.

Further, the breather 40 is disposed in the second space S2 between the first sealing region SA1 and the second sealing region SA2 to surround the first sealing region SA1, and the second space S2 is depressurized in the depressurizing step. For this reason, even when steam infiltrates from a part of the second sealing region SA2 into the second space S2, the steam moves to a place where the steam is to be depressurized via the breather 40. Accordingly, the steam that has infiltrated into the second space S2 can be prevented from reaching the first sealing region SA1. In this manner, in the composite material molding method according to one aspect of the present disclosure, the prepreg P can be efficiently heated using the steam and prevent the steam from reaching the prepreg P.

In addition, in the composite material molding method of the present embodiment, the distance L2 from the outer periphery-side end portion 40a of the breather 40 to the second sealant Se2 is shorter than the distance L1 from the inner periphery-side end portion 40b of the breather 40 to the first sealing region SA1. For this reason, steam that has infiltrated into the second space S2 is likely to flow into the breather 40, and the steam that has infiltrated into the second space S2 is unlikely to reach the first sealant Se1. Accordingly, the steam that has infiltrated into the second space S2 can be prevented from reaching the first sealant Se1 and destroying a part of the first sealant Se1.

In the composite material molding method of the present embodiment, when depressurizing the first space S1 via the vacuum port 51b and depressurizing the second space S2 via the vacuum port 51b and the vacuum port 52b connected to the common vacuum pump 50, the number of vacuum ports 51b used in depressurizing the first space S1 provided for pressurizing the prepreg P by the atmospheric pressure is larger than the number of vacuum ports 52b used in depressurizing the second space S2 provided not for pressurizing the prepreg P by the atmospheric pressure. Accordingly, a defect occurring in a case where steam has infiltrated into the second space S2 can be prevented while reliably depressurizing the first space S1 provided for pressurizing the prepreg P by the atmospheric pressure.

In the composite material molding method of the present embodiment, since the resin bag 30 is a resin film of which a main component is a resin material having higher adhering strength to the first sealant and the second sealant, steam can be prevented from infiltrating from an adhering portion between the jig molding surface 21 and the resin film.

In addition, in the composite material molding method of the present embodiment, since the prepreg P is the laminate in which the fiber preform is laminated together with the resin material, a composite material having sufficient hardness can be molded.

The composite material molding method described in the embodiment described hereinbefore is understood, for example, as follows.

The composite material molding method according to the present disclosure includes the disposing step (S101) of molding the composite material and disposing the composite material (P) on the jig molding surface (21) of the molding jig (20) provided in the internal space (IS) of the pressure vessel (10) capable of being closed, the sealing step (S102) of forming the endless first sealing region (SA1) that surrounds the composite material by adhering the resin bag and the jig molding surface to each other with the first sealant (Se1), forming the endless second sealing region (SA2) that surrounds the composite material by adhering the resin bag and the jig molding surface to each other with the second sealant (Se2) and is disposed on the outer side from the first sealing region, and sealing the composite material airtightly with the resin bag, the depressurizing step (S103) of depressurizing the first space (S1) on the inner side of the first sealing region and the second space (S2) between the first sealing region and the second sealing region, and the heat-curing step of heat-curing the composite material by supplying steam with a predetermined temperature and a predetermined pressure to the internal space of the pressure vessel in a state where the pressure vessel is closed, in which in the sealing step, the ventilation member (40) for securing the ventilation space (SV) is disposed in the second space to surround the first sealing region.

Since the composite material is heat-cured in the composite material molding method according to the aspect of the present disclosure, steam with a predetermined temperature and a predetermined pressure is supplied to the internal space of the pressure vessel in the heat-curing step. For this reason, the composite material can be efficiently and quickly heated with the steam having a larger heat capacity than air compared to a case where the air is used as a heating source.

In addition, the endless first sealing region is formed by adhering the resin bag and the jig molding surface to each other with the first sealant, and the endless second sealing region disposed on the outer side from the first sealing region is formed by adhering the resin bag and the jig molding surface to each other with the second sealant. Since both of the first sealing region and the second sealing region are disposed on the outer side of the composite material, even when steam has infiltrated from a part of the second sealing region, the steam can be prevented from infiltrating into the first space where the composite material is disposed due to the first sealing region disposed on the inner side of the second sealing region.

Further, the ventilation member is disposed in the second space between the first sealing region and the second sealing region to surround the first sealing region, and the second space is depressurized in the depressurizing step. For this reason, even when steam infiltrates from a part of the second sealing region into the second space, the steam moves to a place where the steam is depressurized via the ventilation member. Accordingly, the steam that has infiltrated into the second space can be prevented from reaching the first sealing region. In this manner, in the composite material molding method according to the aspect of the present disclosure, the composite material can be efficiently heated using the steam and prevent the steam from reaching the composite material.

In the composite material molding method according to the aspect of the present disclosure, it is preferable to adopt a configuration where in the sealing step, the ventilation member is disposed in the second space such that the distance from the outer periphery-side end portion of the ventilation member to the second sealing region is shorter than the distance from the inner periphery-side end portion of the ventilation member to the first sealing region.

In the composite material molding method of the present configuration, the distance from the outer periphery-side end portion of the ventilation member to the second sealant is shorter than the distance from the inner periphery-side end portion of the ventilation member to the first sealant. For this reason, steam that has infiltrated into the second space is likely to flow into the ventilation member and the steam that has infiltrated into the second space is unlikely to reach the first sealant. Accordingly, the steam that has infiltrated into the second space can be prevented from reaching the first sealant and destroying a part of the first sealant.

In the composite material molding method according to the aspect of the present disclosure, it is preferable to adopt a configuration where in the depressurizing step, the first space is depressurized via the first depressurization port attached to the resin bag such that the first space and the depressurizing unit communicate with each other, the second space is depressurized via the second depressurization port attached to the resin bag such that the second space and the depressurizing unit communicate with each other, and the number of first depressurization ports attached to the resin bag is larger than the number of second depressurization ports attached to the resin bag.

In the composite material molding method of the present configuration, when depressurizing the first space via the first depressurization port and depressurizing the second space via the first depressurization port and the second depressurization port connected to the common depressurizing unit, the number of first depressurization ports used in depressurizing the first space provided for pressurizing the composite material by the atmospheric pressure is larger than the number of second depressurization ports used in depressurizing the second space provided not for pressurizing the composite material by the atmospheric pressure. Accordingly, a defect occurring in a case where steam has infiltrated into the second space can be prevented while reliably depressurizing the first space provided for pressurizing the composite material by the atmospheric pressure.

In the composite material molding method according to the aspect of the present disclosure, it is preferable to adopt a configuration where the resin bag is formed of a resin film of which a main component is nylon or polyurethane.

In the composite material molding method of the present configuration, since the resin bag is a resin film of which a main component is a resin material having higher adhering strength to the first sealant and the second sealant, steam can be prevented from infiltrating from the adhering portion between the jig molding surface and the resin film.

In the composite material molding method according to the aspect of the present disclosure, it is preferable to adopt a configuration where the composite material is a laminate in which a fiber preform is laminated together with a resin material.

In the composite material molding method of the present configuration, since the composite material is the laminate in which the fiber preform is laminated together with the resin material, a composite material having sufficient hardness can be molded.

The composite material molding device described in the embodiment described hereinbefore is understood, for example, as follows.

The composite material molding device according to one aspect of the present disclosure molds a composite material and includes the pressure vessel capable of being closed, the molding jig that is provided in the internal space of the pressure vessel and has the jig molding surface for disposing the composite material, the resin bag that forms the endless first sealing region, which surrounds the composite material, by being adhered to the jig molding surface with the first sealant, forms the endless second sealing region, which surrounds the composite material and is disposed on the outer side from the first sealing region, by being adhered to the jig molding surface with the second sealant, and airtightly seals the composite material, the depressurizing unit that depressurizes the first space on the inner side of the first sealing region and the second space between the first sealing region and the second sealing region, the ventilation member that secures the ventilation space in the second space depressurized by the depressurizing unit, and the steam supply unit that supplies steam with a predetermined temperature and a predetermined pressure to the internal space of the pressure vessel in a state where the pressure vessel is closed and heat-cures the composite material.

Since the composite material is heat-cured in the composite material molding device according to the aspect of the present disclosure, the steam supply unit supplies steam with a predetermined temperature and a predetermined pressure to the internal space of the pressure vessel. For this reason, the composite material can be efficiently and quickly heated with the steam having a larger heat capacity than air compared to a case where the air is used as a heating source.

In addition, the endless first sealing region is formed by adhering the resin bag and the jig molding surface to each other with the first sealant, and the endless second sealing region disposed on the outer side from the first sealing region is formed by adhering the resin bag and the jig molding surface to each other with the second sealant. Since both of the first sealing region and the second sealing region are disposed on the outer side of the composite material, even when steam has infiltrated from a part of the second sealing region, the steam can be prevented from infiltrating into the space where the composite material is disposed due to the first sealing region disposed on the inner side of the second sealing region.

Further, the ventilation member is disposed in the second space between the first sealing region and the second sealing region to surround the first sealing region, and the second space is depressurized by the depressurizing unit. For this reason, even when steam infiltrates from a part of the second sealing region into the second space, the steam moves to a place where the steam is depressurized via the ventilation member. Accordingly, the steam that has infiltrated into the second space can be prevented from reaching the first sealing region. In this manner, in the composite material molding device according to the aspect of the present disclosure, the composite material can be efficiently heated using the steam and prevent the steam from reaching the composite material.

In the composite material molding device according to the aspect of the present disclosure, it is preferable to adopt a configuration where the ventilation member is disposed in the second space such that the distance from the outer periphery-side end portion to the second sealant is shorter than the distance from the inner periphery-side end portion to the first sealant.

In the composite material molding device of the present configuration, since the distance from the outer periphery-side end portion of the ventilation member to the second sealant is shorter than the distance from the inner periphery-side end portion of the ventilation member to the first sealant, steam that has infiltrated into the second space is likely to flow into the ventilation member, and the steam that has infiltrated into the second space is unlikely to reach the first sealant. Accordingly, the steam that has infiltrated into the second space can be prevented from reaching the first sealant and destroying a part of the first sealant.

In the composite material molding device according to the aspect of the present disclosure, it is preferable to adopt a configuration where the depressurizing unit depressurizes the first space via the first depressurization port attached to the resin bag, depressurizes the second space via the second depressurization port attached to the resin bag, and the number of first depressurization ports attached to the resin bag is larger than the number of second depressurization ports attached to the resin bag.

In the composite material molding device of the present configuration, when depressurizing the first space via the first depressurization port and depressurizing the second space via the first depressurization port and the second depressurization port connected to the common depressurizing unit, the number of first depressurization ports used in depressurizing the first space provided for pressurizing the composite material by the atmospheric pressure is larger than the number of second depressurization ports used in depressurizing the second space provided not for pressurizing the composite material by the atmospheric pressure. Accordingly, a defect occurring in a case where steam has infiltrated into the second space can be prevented while reliably depressurizing the first space provided for pressurizing the composite material by the atmospheric pressure.

In the composite material molding device according to the aspect of the present disclosure, it is preferable to adopt a configuration where the resin bag is formed of a resin film of which a main component is nylon or polyurethane.

In the composite material molding device of the present configuration, since the resin bag is a resin film of which a main component is a resin material having higher adhering strength to the sealants, steam can be prevented from infiltrating from the adhering portion between the jig molding surface and the resin film.

In the composite material molding device according to the aspect of the present disclosure, it is preferable to adopt a configuration where the composite material is a laminate in which a fiber preform is laminated together with a resin material.

In the composite material molding device of the present configuration, since the composite material is the laminate in which the fiber preform is laminated together with the resin material, a composite material having sufficient hardness can be molded.

The invention claimed is:

1. A composite material molding method of molding a composite material, the method comprising:
   a disposing step of disposing the composite material on a jig molding surface of a molding jig provided in an internal space of a pressure vessel capable of being closed;
   a sealing step of forming an endless first sealing region that surrounds the composite material by adhering a resin bag and the jig molding surface to each other with a first sealant, forming an endless second sealing region that surrounds the composite material and is disposed on an outer side from the first sealing region by adhering the resin bag and the jig molding surface to each other with a second sealant, and airtightly sealing the composite material with the resin bag;

a depressurizing step of depressurizing a first space on an inner side of the first sealing region and a second space between the first sealing region and the second sealing region; and a heat-curing step of heat-curing the composite material by supplying steam with a predetermined temperature and a predetermined pressure to the internal space of the pressure vessel in a state where the pressure vessel is closed, wherein in the sealing step, a ventilation member for securing a ventilation space is disposed in the second space to surround the first sealing region, and in the sealing step, the ventilation member is disposed in the second space such that a distance from an outer periphery-side end portion of the ventilation member to the second sealant is shorter than a distance from an inner periphery-side end portion of the ventilation member to the first sealant.

2. A composite material molding method of molding a composite material, the method comprising:

a disposing step of disposing the composite material on a jig molding surface of a molding jig provided in an internal space of a pressure vessel capable of being closed;

a sealing step of forming an endless first sealing region that surrounds the composite material by adhering a resin bag and the jig molding surface to each other with a first sealant, forming an endless second sealing region that surrounds the composite material and is disposed on an outer side from the first sealing region by adhering the resin bag and the jig molding surface to each other with a second sealant, and airtightly sealing the composite material with the resin bag;

a depressurizing step of depressurizing a first space on an inner side of the first sealing region and a second space between the first sealing region and the second sealing region; and a heat-curing step of heat-curing the composite material by supplying steam with a predetermined temperature and a predetermined pressure to the internal space of the pressure vessel in a state where the pressure vessel is closed, wherein in the sealing step, a ventilation member for securing a ventilation space is disposed in the second space to surround the first sealing region, and in the depressurizing step, the first space is depressurized via a first depressurization port attached to the resin bag such that the first space and a depressurizing unit communicate with each other, and the second space is depressurized via a second depressurization port attached to the resin bag such that the second space and the depressurizing unit communicate with each other, and the number of the first depressurization ports attached to the resin bag is larger than the number of the second depressurization ports attached to the resin bag.

3. The composite material molding method according to claim 1, wherein the resin bag is formed of a resin film of which a main component is nylon or polyurethane.

4. The composite material molding method according to claim 1, wherein the composite material is a laminate in which a fiber preform is laminated together with a resin material.

5. A composite material molding device that molds a composite material, the device comprising:

a pressure vessel capable of being closed;

a molding jig that is provided in an internal space of the pressure vessel and has a jig molding surface for disposing the composite material;

a resin bag that forms an endless first sealing region which surrounds the composite material by being adhered to the jig molding surface with a first sealant, forms an endless second sealing region which surrounds the composite material and is disposed on an outer side from the first sealing region by being adhered to the jig molding surface with a second sealant, and airtightly seals the composite material;

a depressurizing unit that depressurizes a first space on an inner side of the first sealing region and a second space between the first sealing region and the second sealing region;

a ventilation member that secures a ventilation space in the second space depressurized by the depressurizing unit; and a steam supply unit that supplies steam with a predetermined temperature and a predetermined pressure to the internal space of the pressure vessel in a state where the pressure vessel is closed, and heat-cures the composite material, wherein the ventilation member is disposed in the second space such that a distance from an outer periphery-side end portion thereof to the second sealant is shorter than a distance from an inner periphery-side end portion thereof to the first sealant.

6. A composite material molding device that molds a composite material, the device comprising:

a pressure vessel capable of being closed;

a molding jig that is provided in an internal space of the pressure vessel and has a jig molding surface for disposing the composite material;

a resin bag that forms an endless first sealing region which surrounds the composite material by being adhered to the jig molding surface with a first sealant, forms an endless second sealing region which surrounds the composite material and is disposed on an outer side from the first sealing region by being adhered to the jig molding surface with a second sealant, and airtightly seals the composite material;

a depressurizing unit that depressurizes a first space on an inner side of the first sealing region and a second space between the first sealing region and the second sealing region;

a ventilation member that secures a ventilation space in the second space depressurized by the depressurizing unit; and a steam supply unit that supplies steam with a predetermined temperature and a predetermined pressure to the internal space of the pressure vessel in a state where the pressure vessel is closed, and heat-cures the composite material, wherein the depressurizing unit depressurizes the first space via a first depressurization port attached to the resin bag and depressurizes the second space via a second depressurization port attached to the resin bag, and the number of the first depressurization ports attached to the resin bag is larger than the number of the second depressurization ports attached to the resin bag.

7. The composite material molding device according to claim 5,
   wherein the resin bag is formed of a resin film of which a main component is nylon or polyurethane.

8. The composite material molding device according to claim 5, wherein the composite material is a laminate in which a fiber preform is laminated together with a resin material.

\* \* \* \* \*